(12) United States Patent
Grimoldi (10) Patent No.: US 12,311,488 B2
(45) Date of Patent: May 27, 2025

(54) DEVICE FOR THE AUTOMATIC CONNECTION OF A HIGH SPEED SPINDLE TO A NUMERICALLY CONTROLLED MACHINE

(71) Applicant: Sales S.R.L., Milan (IT)

(72) Inventor: Andrea Davide Grimoldi, Milan (IT)

(73) Assignee: Sales S.R.L., Milan (IT)

( * ) Notice: Subject to any disclaimer, the term of this patent is extended or adjusted under 35 U.S.C. 154(b) by 296 days.

(21) Appl. No.: 17/910,579

(22) PCT Filed: Feb. 24, 2021

(86) PCT No.: PCT/IT2021/050039
§ 371 (c)(1),
(2) Date: Sep. 9, 2022

(87) PCT Pub. No.: WO2021/181433
PCT Pub. Date: Sep. 16, 2021

(65) Prior Publication Data
US 2023/0166372 A1 Jun. 1, 2023

(30) Foreign Application Priority Data
Mar. 11, 2020 (IT) .................. 102020000005227

(51) Int. Cl.
*B23Q 3/157* (2006.01)
*B23Q 5/04* (2006.01)
*B23Q 5/10* (2006.01)

(52) U.S. Cl.
CPC ............. *B23Q 3/157* (2013.01); *B23Q 5/048* (2013.01); *B23Q 5/10* (2013.01);
(Continued)

(58) Field of Classification Search
CPC ...... B23Q 1/0018; B23Q 3/157; B23Q 5/048; B23Q 5/06; B23Q 5/08; B23Q 5/10;
(Continued)

(56) References Cited

U.S. PATENT DOCUMENTS 4,534,803 A * 8/1985 Asano ................ B23Q 1/0018
409/137
4,536,661 A * 8/1985 McMurtry ............ G01B 7/002
33/561
(Continued)

FOREIGN PATENT DOCUMENTS

EP 1114693 A2 * 7/2001 ........... B23Q 1/0009
EP 3144098 A2 * 3/2017 ............. B23B 31/28
(Continued)

*Primary Examiner* — Sunil K Singh
*Assistant Examiner* — Michael Vitale
(74) *Attorney, Agent, or Firm* — Luedeka Neely, P.C.

(57) ABSTRACT

A device (10) for the automatic connection of a high speed spindle (40) to a numerically controlled machine is described, comprising a first connecting element (11) and a second connecting element (31), the first connecting element connection (11) comprising a first electrical contact element (14) and a first duct (12) for the passage of pressurized air; the second connecting element (31) comprising a second electrical contact element (34) configured to establish an electrical contact with said first electrical contact element (14) and electrically power the spindle at high speed (40), and a second conduit (32) for the passage of the pressurized air coming from the first duct (12); a method is also described for automatically sealing the first and second connecting elements (11, 31) of the device (10).

9 Claims, 9 Drawing Sheets

(52) U.S. Cl.
CPC .... *Y10T 409/309296* (2015.01); *Y10T 483/10* (2015.01); *Y10T 483/15* (2015.01)

(58) Field of Classification Search
CPC .......... B23Q 2220/008; B23Q 2705/04; B23C 9/005; Y10T 408/65; Y10T 408/655; Y10T 408/94; Y10T 409/303752; Y10T 409/309296; Y10T 409/309352; Y10T 409/309408; Y10T 483/10; Y10T 483/15
USPC .............. 409/131, 230, 231, 232; 483/1, 13
See application file for complete search history.

(56) References Cited

U.S. PATENT DOCUMENTS

| | | | | |
|---|---|---|---|---|
| 4,960,405 | A | * | 10/1990 | Katayama .............. B23Q 5/048 |
| | | | | 475/183 |
| 4,981,403 | A | * | 1/1991 | Katayama .............. B23Q 5/048 |
| | | | | 409/137 |
| 5,697,739 | A | * | 12/1997 | Lewis ................ B23Q 11/1023 |
| | | | | 409/230 |
| 2004/0146368 | A1 | * | 7/2004 | Konishi ................. B23Q 3/157 |
| | | | | 409/230 |
| 2006/0258521 | A1 | * | 11/2006 | Bryan .................. B23Q 1/0018 |
| | | | | 409/230 |
| 2008/0093094 | A1 | * | 4/2008 | Bryan ...................... B23Q 5/06 |
| | | | | 409/230 |
| 2008/0146425 | A1 | * | 6/2008 | Bryan .................. B23B 31/261 |
| | | | | 137/15.18 |
| 2014/0018219 | A1 | * | 1/2014 | Dodds ................ B23Q 3/15706 |
| | | | | 483/19 |
| 2016/0184941 | A1 | * | 6/2016 | Kao ..................... B23Q 1/0009 |
| | | | | 307/104 |

FOREIGN PATENT DOCUMENTS

| | | | | | |
|---|---|---|---|---|---|
| JP | 62015048 | A | * | 1/1987 | |
| JP | 05116050 | A | * | 5/1993 | |
| JP | 0669658 | B2 | * | 9/1994 | |
| JP | 2001079727 | A | * | 3/2001 | ............. B23Q 5/048 |
| JP | 2003145381 | A | * | 5/2003 | ............. B23Q 5/048 |

* cited by examiner

The High-Speed Spindle And The Numerically Controlled Machine Are Automatically Connected By Means of a Tool Change System

FIG. 9

DEVICE FOR THE AUTOMATIC CONNECTION OF A HIGH SPEED SPINDLE TO A NUMERICALLY CONTROLLED MACHINE

The present invention refers to a device for the automatic connection of a high-speed spindle to a numerically controlled machine, in particular for the automatic connection of a high-speed electro-spindle to a tool-holder spindle of a numerically controlled machine.

Numerical control machines are known in the art and comprise spindles whose tool-holder is connected to an electric motor that must be sized according to the performance, in terms of rotation speed and drive torque, required by the tool to perform the machining.

Document EP-A1-1114693 describes a device for the automatic connection of a high speed spindle to a numerically controlled machine according to the preamble of claim 1.

These known numerical control machines, when used for machining with tools at high speed of rotation, have the problem of requiring the use of a specific electro-spindle, comprising a tool and an electric motor for high-speed drive of the tool, which must be coupled to the tool-holder spindle and manually connected by an operator to the numerically controlled machine with a series of electrical, hydraulic and/or pneumatic connectors, with a consequent waste of time and an increase in machining costs.

Object of the present invention is solving the aforementioned prior art problems, by providing a device for connecting a high-speed spindle to a numerically controlled machine which allows to use a high-speed electro-spindle by connecting it to the tool-holder spindle of the numerically controlled machine in automatic mode, without requiring the intervention of an operator to perform the coupling of the high speed spindle with the tool-holder spindle, with a consequent saving of time and reduction of the machining cost.

The aforesaid and other objects and advantages of the invention, as will emerge from the following description, are achieved with a device for the automatic connection of a high-speed spindle to a numerically controlled machine such as that described in claim 1. Preferred embodiments and non-trivial variants of the present invention form the subject of the dependent claims.

It is understood that all attached claims form an integral part of the present description.

It will be immediately obvious that innumerable variations and modifications (for example relating to shape, dimensions, arrangements and parts with equivalent functionality) can be made to what is described, without departing from the scope of the invention as appears from the attached claims.

The present invention will be better described by some preferred embodiments, provided by way of non-limiting example, with reference to the attached drawings, in which.

With reference to the Figures, the device 10 for the automatic connection of a high speed spindle 40 to a numerically controlled machine of the present invention comprises a first connecting element 11, configured to be fixed to a tool holder spindle of a numerically controlled machine, preferably fixed to a support structure of the spindle, and a second connecting element 31, configured to be connected to the first connecting element 11 and to be fixed to the high-speed spindle 40, preferably an electro-spindle comprising a tool 41 and an electric motor for the high speed drive of the tool 41, said first connecting element 11 and second connecting element 31 being configured to automatically perform the electrical and pneumatic connection of the high speed spindle 40.

The first connection element 11 comprises at least one first electrical contact element 14, preferably a spring contact of a known type, for example a plurality of spring contacts made of nickel, silver, stainless steel, copper-beryllium, gold plated, to power electrically the high-speed spindle 40, and a first duct 12 for the passage of pressurized air, for example through a chamber 15 and an inlet pipe 16 to the chamber 15, connected to a pressurized air supply network.

The second connecting element 31 comprises at least a second electrical contact element 34, preferably a plurality of bars made of electrically conductive material configured to establish an electrical contact with said first electrical contact element 14 and electrically power the high-speed spindle 40, and a second duct 32 for the passage of the pressurized air coming from the first duct 12 of the first connection element 11.

Figure 1:
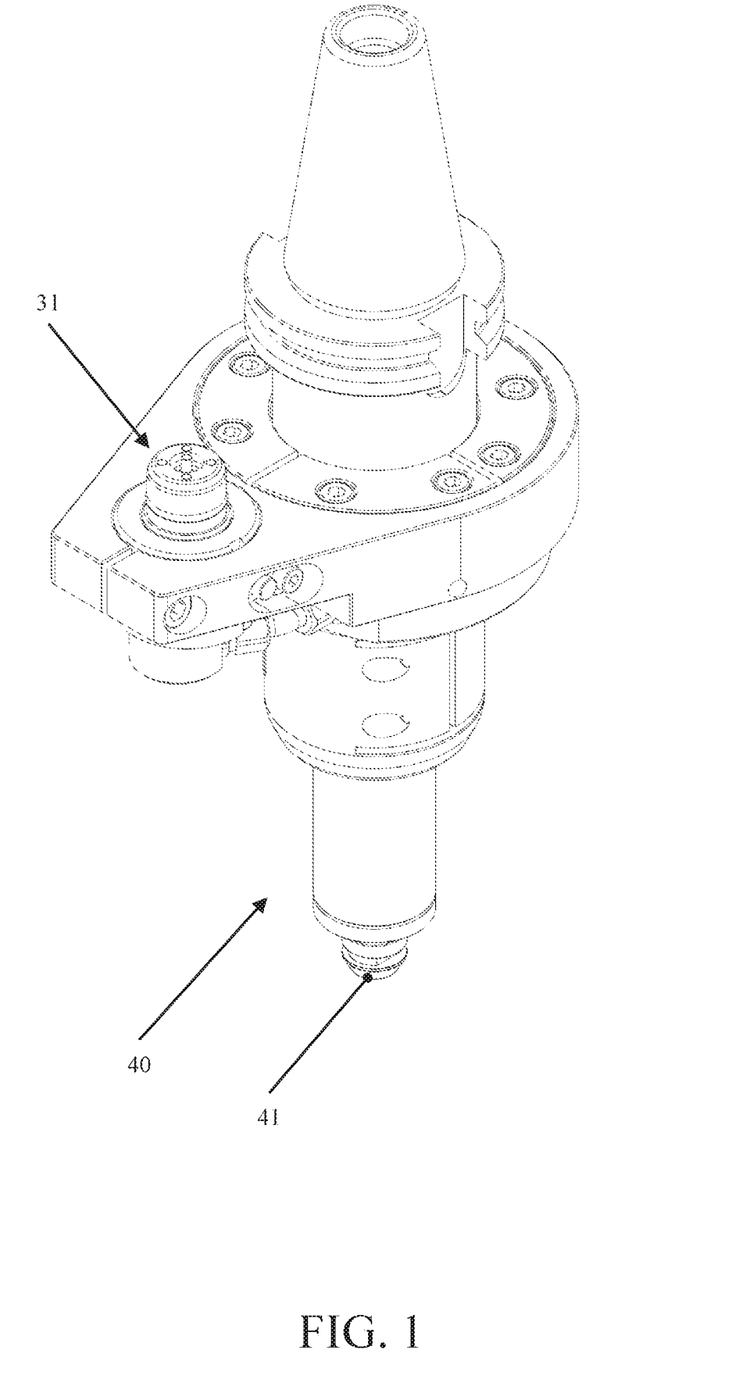
FIG. 1 shows a view of a high speed spindle comprising a device for automatic connection to a numerically controlled machine according to the present invention.
Figure 2:
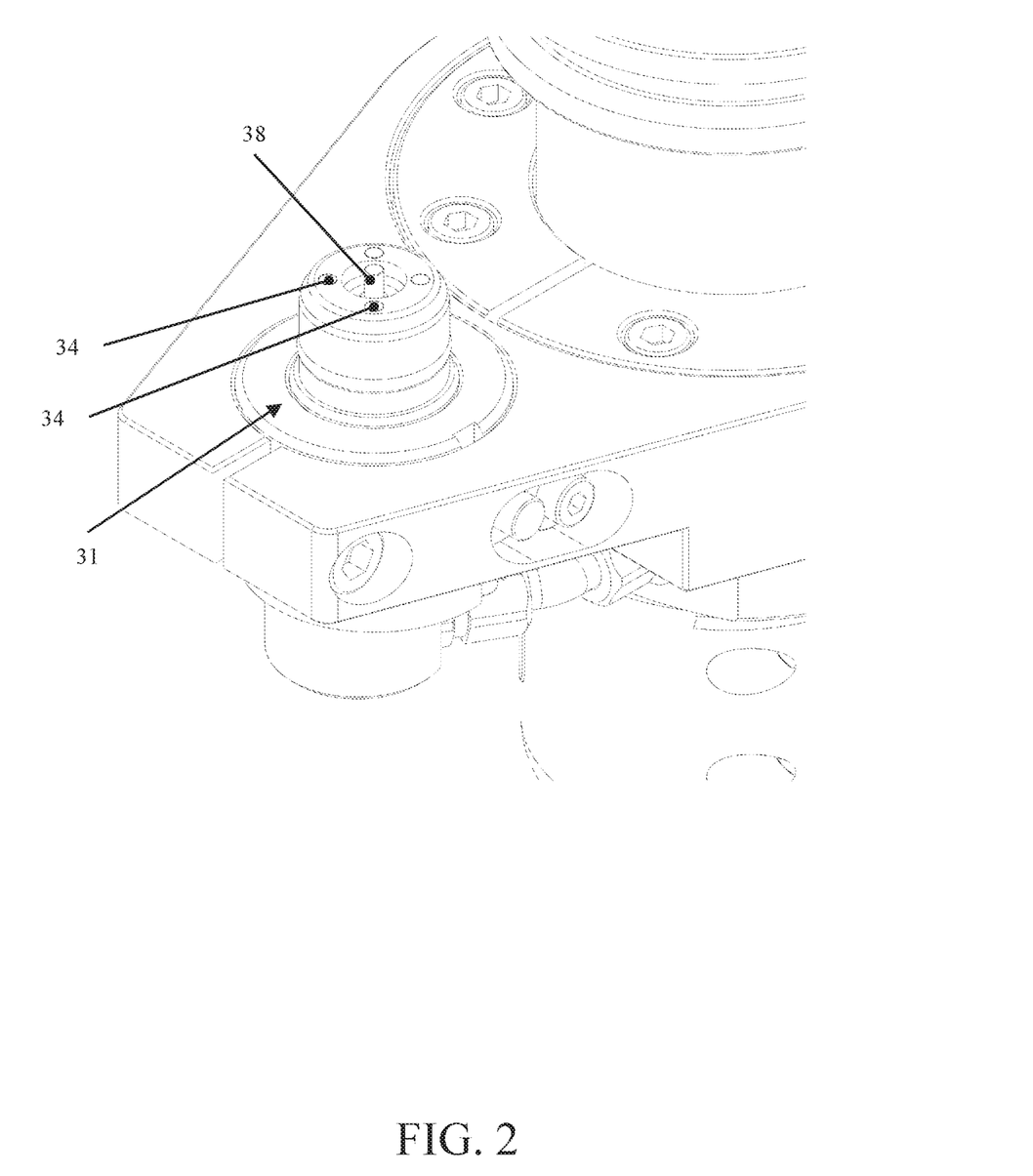
FIGS. 2 to 8 show views of a device for the automatic connection of a high speed spindle to a numerically controlled machine according to the present invention.
Figure 3:
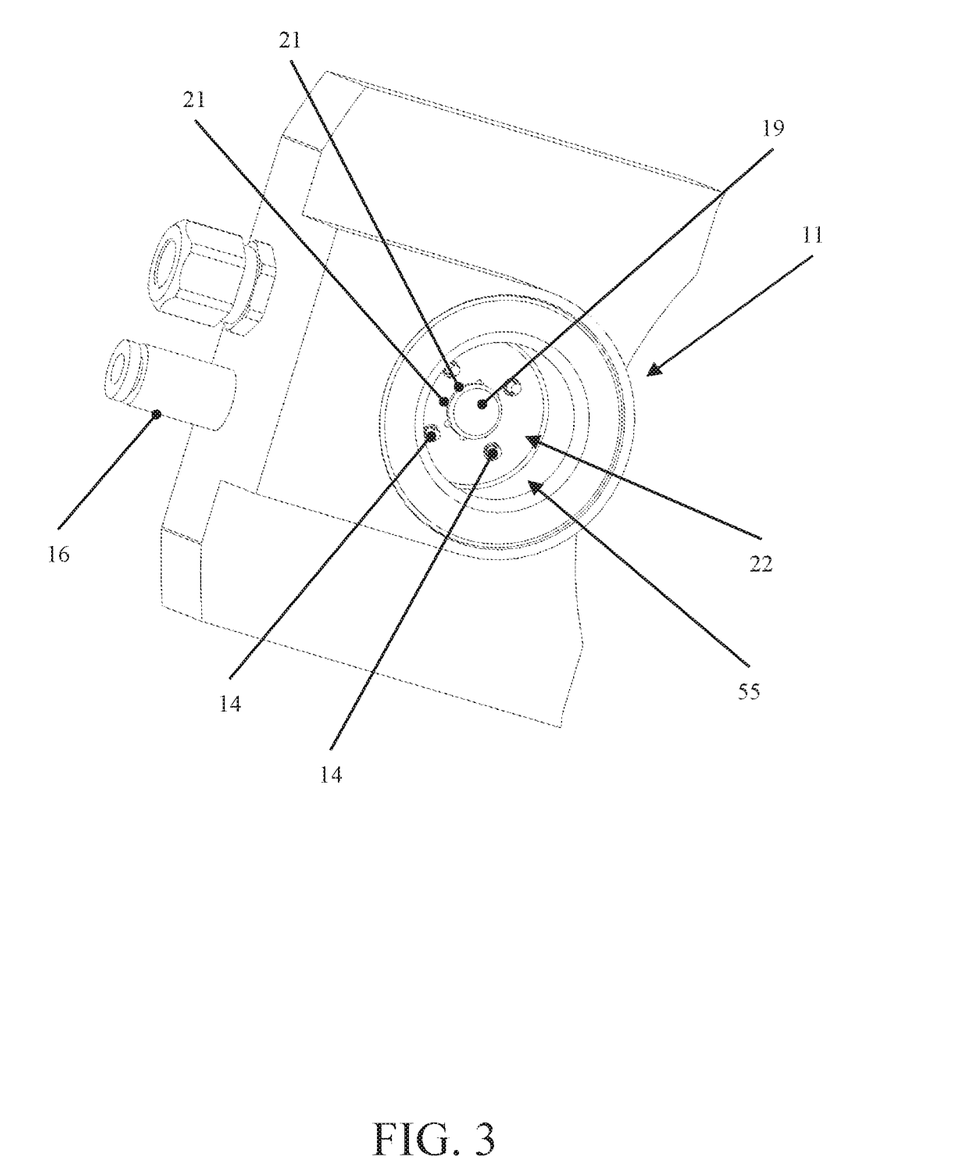
Figure 4:
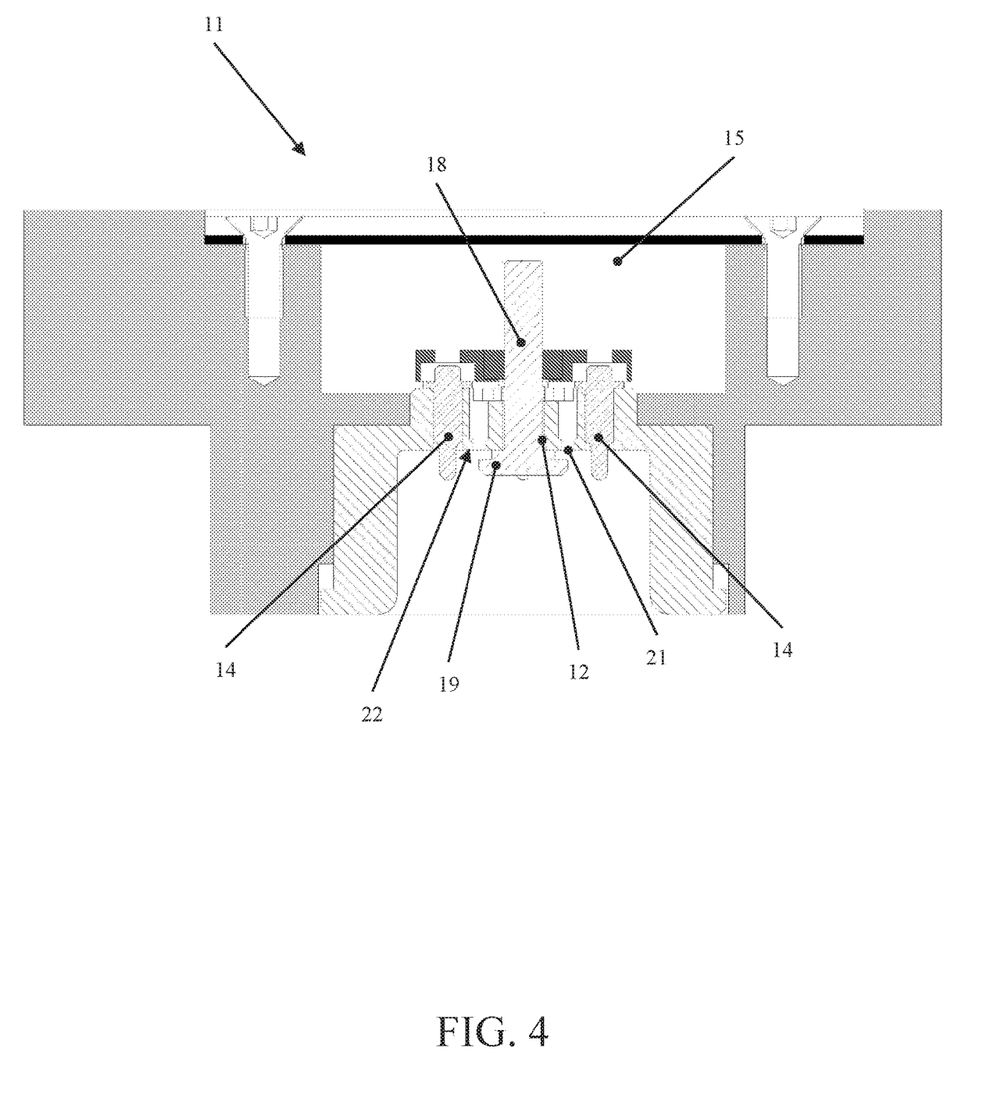
Figure 5:
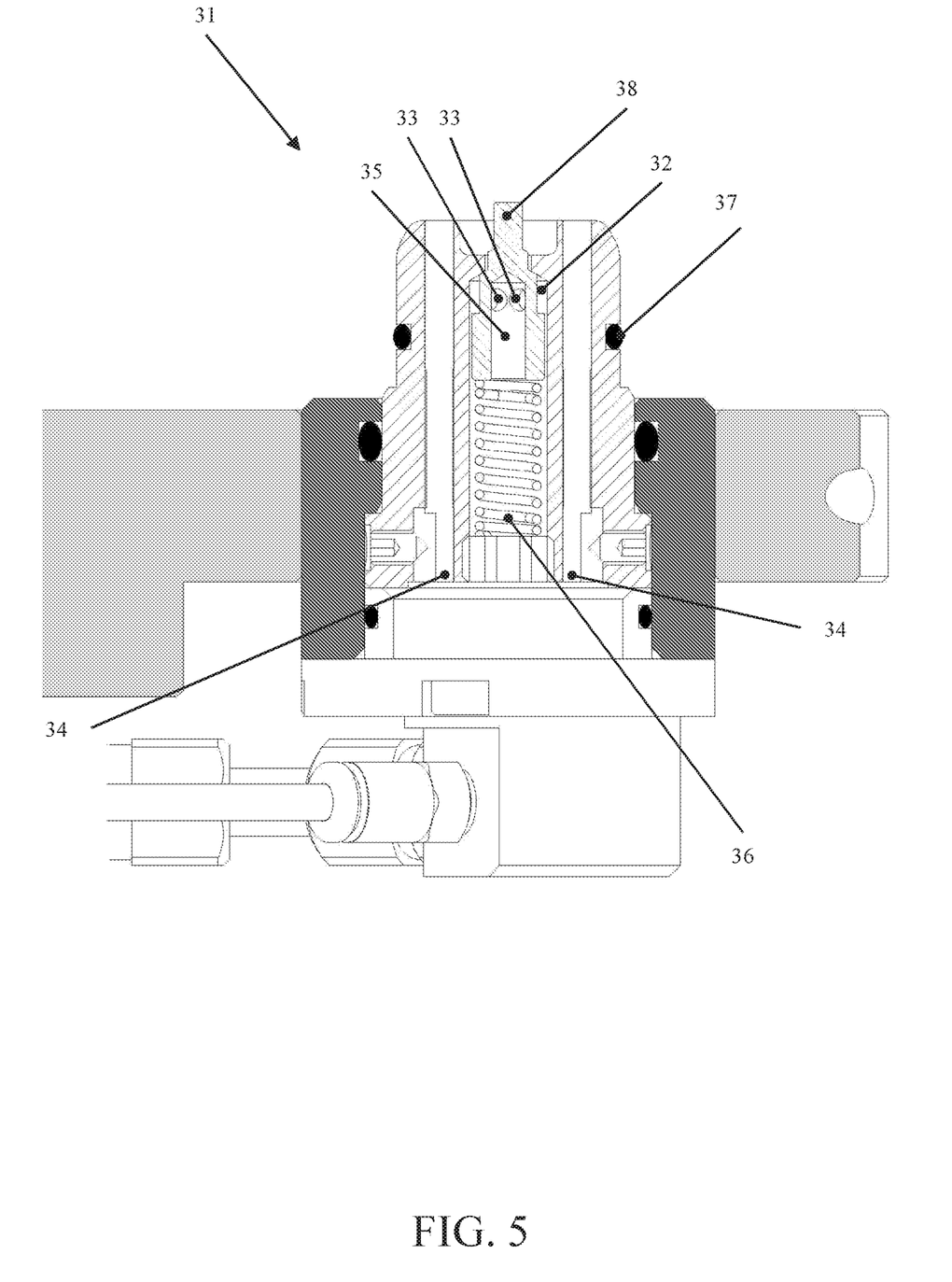
Figure 6:
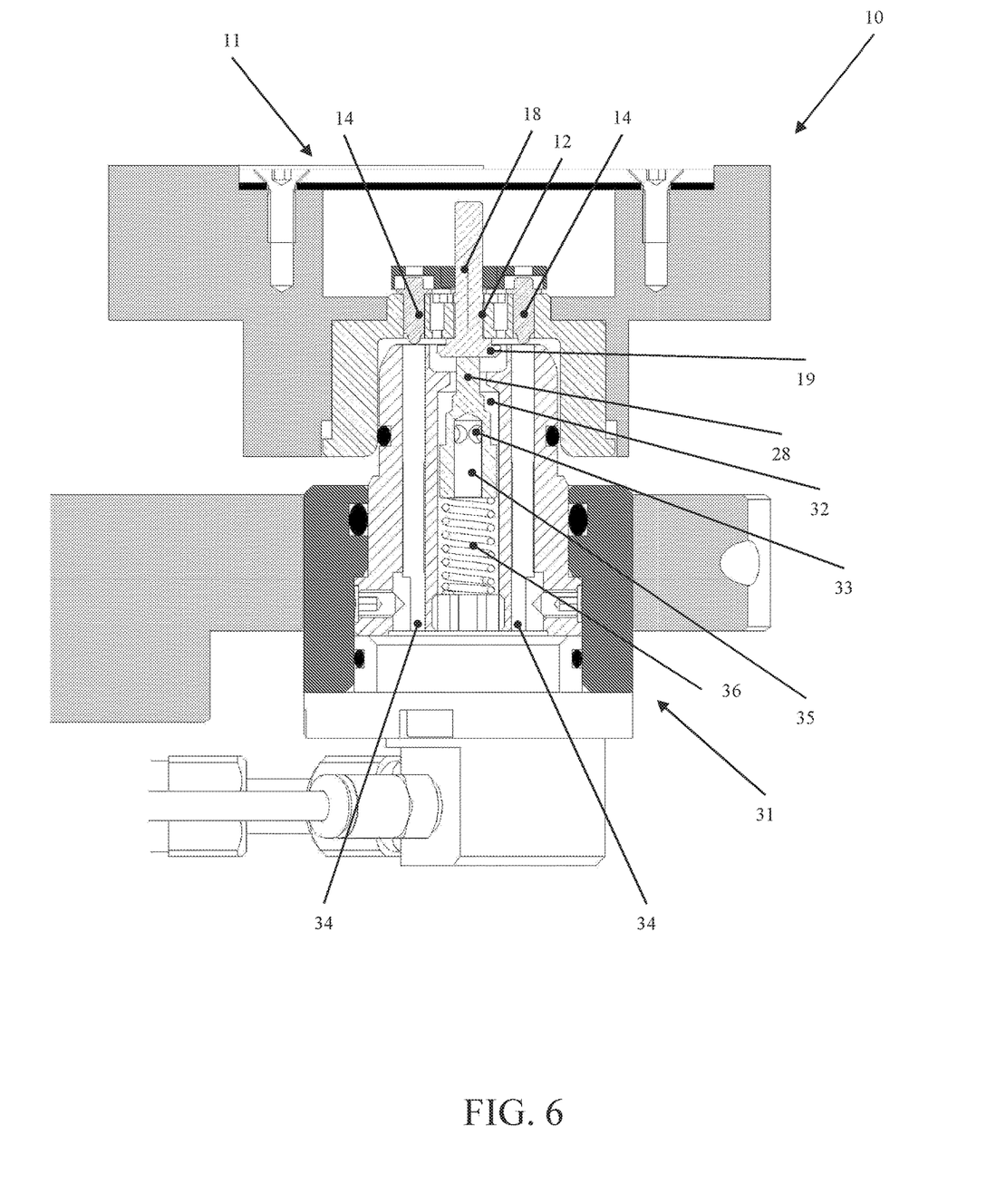
Figure 7:
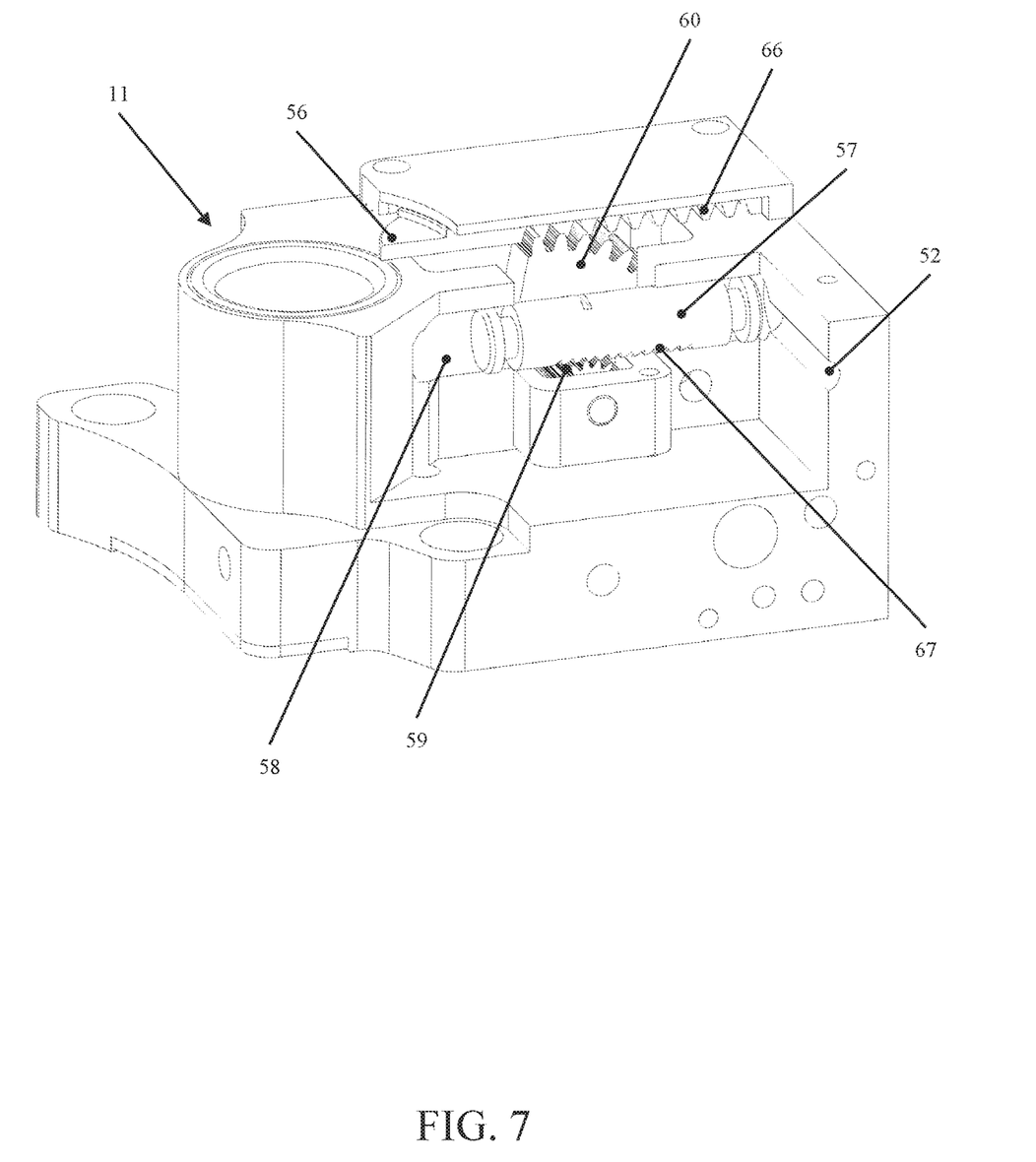
Figure 8:
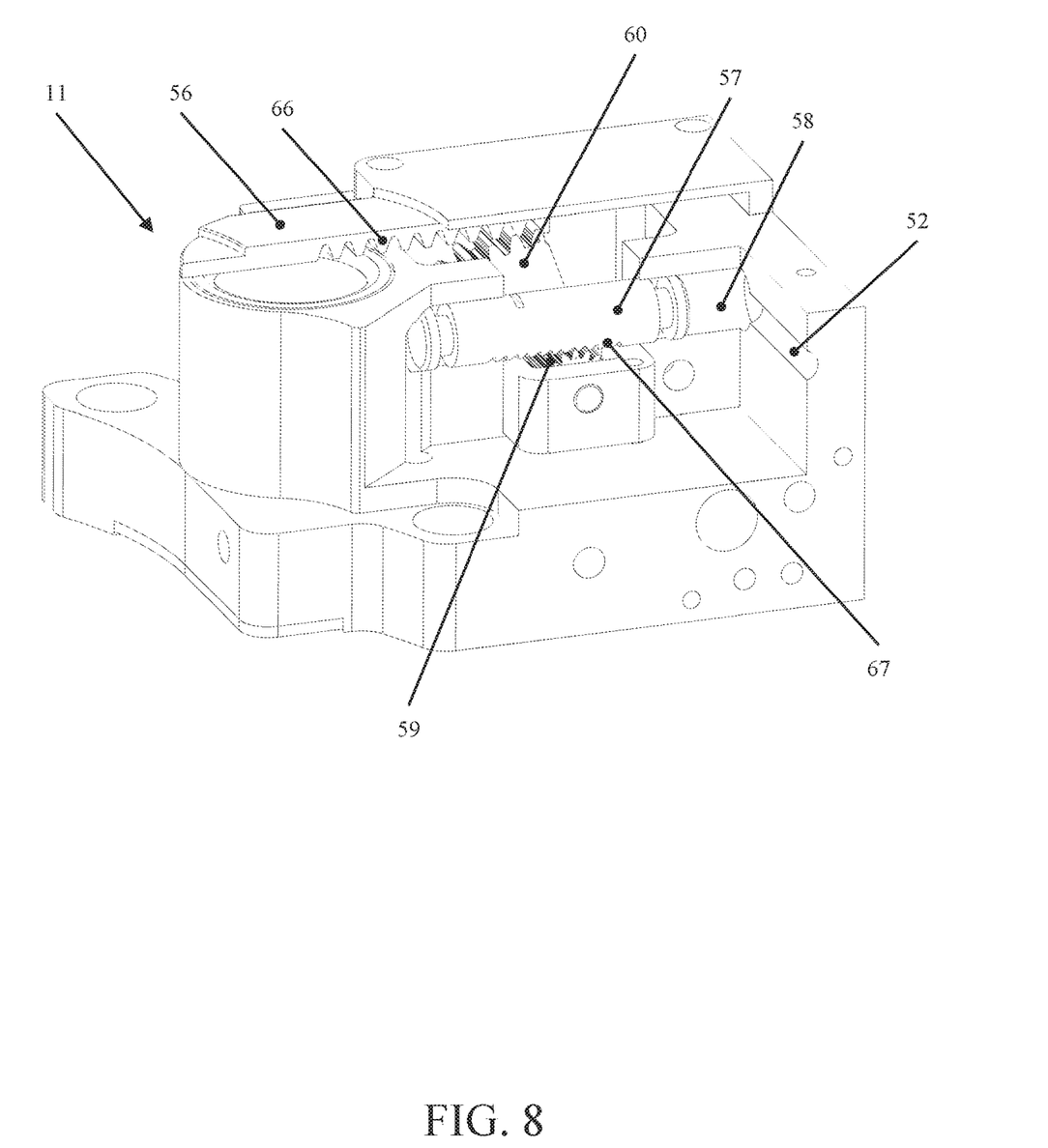

Preferably, the first connecting element 11 comprises a plurality of holes 21 made in a closing wall 22 of the first duct 12 and also comprises a pressure element 18 inserted inside the first duct 12 and configured to exert a pressure on a pin 38 of the second connecting element 31, as will be explained in greater detail below, when said first and second connecting elements 11, 31 are sealed, said pressure element 18 having one end connected to a plate 19 configured to divert the flow of air coming out of the holes 21, so as to keep the surface of the first and second electrical contact elements 14, 34 and the inside of the first connecting element 11 clean before the first and second connecting elements are connected to seal, as shown in FIGS. 3 and 4; preferably the closing wall 22 comprises a plurality of holes 21 arranged in a circle around the pressure element 18.

When said first and second connecting elements 11, 31 are not tightly connected, there is a space between the first connecting element 11 and the second connecting element 31, as shown in FIG. 4, the pin 38 is inserted inside the second duct 32 so as to prevent the flow of air from the second duct 32 to the spindle 40 and the pressing element is configured to come into contact with the pin 38 when the electrical contact elements 14, 34 are not in contact, allowing the flow of air coming from the first duct 12 passes through the space between the first connection element 11 and the second connection element 31 which are not sealed and exits outside.

Preferably, the second connecting element 31 also comprises the pin 38 inserted inside the second conduit 32, said pin 38 having the outer surface mating with the inner surface of the second conduit 32 to prevent the flow of air between the pin 38 and the second conduit 32, and from these to the spindle 40, when the first 11 and the second 31 connecting element are not sealed; preferably, said pin 38 comprises an internal seat 35 communicating with the duct 32 by means of a plurality of openings 33, and communicating with the high-speed spindle 40, to allow the passage of the air flow from the second duct 32 to the spindle 40 when the pressure element 18 exerts pressure on the pin 38 to move the outer surface of the pin 38 away from the inner surface of the conduit 32, for example by axially sliding the pin 38 in the conduit 32, and the air flow can flow between the pin 38 and the second conduit 32, and the first and second connecting elements 11, 31 are sealed together.

Preferably, said pin 38 is connected to elastic means 36, for example a spring 36, configured to exert a force on the pin 38 so as to bring the pin 38 into contact with the second conduit 32 and close the openings 33 when the pressure element 18 it is moved away from the pin 38 and the connecting elements 11, 31 are separated.

Preferably, the first connection element 11 comprises a seat 55 for the insertion of the second connection element 31 so that said seat 55 has the internal surface substantially shaped like the external surface of the second connection element 31; preferably the first and/or the second connecting elements 11, 31 comprise sealing means 37, for example a sealing O-ring 37 inserted in a groove formed on the external surface of the second connecting element 31, to seal the first connecting element 11 and the second connecting element 31 so as to prevent the air flow, flowing between the first and second connecting elements 11, 31, from exiting to the outside and so as to allow the flow of d air from the first to the second connecting element 11, 31 through the respective ducts 12, 32 to send it to the spindle 40.

Figure 9:
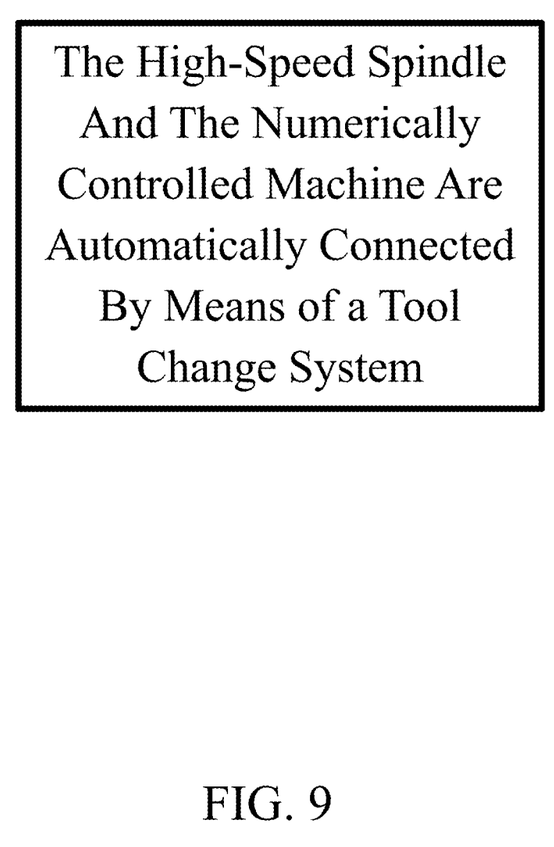

In operation of the device 10 of the present invention, the high-speed spindle 40 and the numerically controlled machine are automatically connected by means of a known tool change system, configured to position the spindle so as to sealingly connect the first 11 and the second 31 connecting element, connect the electrical contacts 14, 34 and let the air flow pass from the first 11 to the second 31 connecting element to reach the mandrel 40.

Preferably, the first connecting element 11 comprises a closing element 56, for example a sliding lid, controlled by actuation means 57 comprising for example a pneumatic element, such as a cylinder, fed with a pressurized fluid, preferably compressed air, coming from a third duct 52, so that said pneumatic element 57 slides inside a seat 58, being connected to a pair of gears 59, 60 configured to move the closing element 56.

In particular, the pair of gears 59, 60 comprises a first toothed wheel 59 engaged in a toothing 67 obtained on the cylinder 57 so that said first wheel 59 is made to rotate by the movement of the cylinder/pneumatic element 57 in the seat 58, the first being said wheel 59 in turn connected on the same axis to a second toothed wheel 60 engaged in a toothing 66 obtained on the cover/closing element 56 so that said second wheel 60 is rotated by the movement of the first wheel 59 connected to the cylinder/pneumatic element 57 and slide the cover/latch 56.

Preferably, the first connecting element 11 also comprises at least one sensor, for example proximity, to check the correct opening or closing of the closing element.

To automatically seal the first and second connecting elements 11, 31, the following steps are envisaged:

a step of inserting the second connecting element 31 inside the seat 55 of the first connecting element 11, so that the first and second connecting elements 11, 31 are connected not tightly and therefore there is a space between the seat 55 of the first connecting element 11 and the second connecting element 31, as shown in FIG. 4; in this step the electrical contact elements 14, 34 are not yet in contact, the pressure element 18 and the pin 38 are in contact, and the air flow coming from the first duct 12 passes through the holes 21 of the closing wall 22, is deflected by the plate 19, crosses the space between the seat 55 of the first connection element 11 and the second connection element 31 and exits outside;

a step in which the sealed connection is made by exerting a pressure, for example through the mandrel, between the first and second connection elements 11, 31, so that the internal surface of the seat 55 of the first connection element 11 is substantially at contact with the external surface of the second connection element 31 and the sealing means 37 prevent the air flow from flowing between first and second connection element 11, 31; in this step, the electrical contact is established between the electrical contact elements 14, 34 and the pressure element 18, in particular the plate 19, exerts a pressure on the pin 38 which, by compressing the elastic means 36, causes said pin 38 to slide into the second duct 32 allowing the passage of the air flow coming from the first duct 12 to the second duct 32 and, through the openings 33, into the internal seat 35 of the pin 38 and towards the high-speed spindle 40.

Advantageously, the device for the automatic connection of a high-speed spindle to a numerically controlled machine according to the present invention allows using a high-speed electro-spindle by connecting it to the tool-holder spindle of the numerically controlled machine, without requiring the intervention of an operator to perform the coupling of the spindle at high speed with the tool holder spindle, with a consequent saving of time and reduction of the machining cost.

The invention claimed is:

1. A device (10) for an automatic connection of a high-speed spindle (40) to a numerically controlled machine, the device (10) comprising:
  a first connecting element (11) which is configured to be fastened to a tool-holder spindle of the numerically controlled machine, and
  a second connecting element (31) which is configured to be connected to the first connecting element (11) and which is configured to be fastened to the high-speed spindle (40), the high-speed spindle comprising a tool (41) and an electric motor for actuating the tool (41),
  wherein the first connecting element (11) comprises at least one first electric contact element (14) to electrically power the high-speed spindle (40),
  wherein the first connecting element (11) further comprises a first duct (12) for passing pressurized air there through, the first duct (12) being connected to a supply network from which the pressurized air is supplied,
  wherein the second connecting element (31) comprises at least one second electric contact element (34) which is configured to establish an electric contact with said at least one first electric contact element (14) in order to electrically power the high-speed spindle (40),
  wherein the second connecting element (31) further comprises a second duct (32) for passing pressurized air, coming from the first duct (12), there through,
  wherein said first connecting element (11) and/or the second connecting element (31) further comprises a sealing means (37) to sealingly connect the first connecting element (11) and the second connecting element (31) to one another,
  wherein, when the sealing means (37) sealingly connects the first connecting element (11) and the second connecting element (31) to one another, the sealing means (37) prevents an air flow of the pressurized air from flowing outside of the device (10), thereby maintaining the air flow between the first and the second connecting elements (11, 31) and ensuring a passage of the air flow through the first duct (12) of the first connecting element (11) and into the second duct (31) of the second connecting element (31) so as to send the air flow of the pressurized air to the high-speed spindle (40), wherein said second connecting element (31) comprises a pin (38) which is inserted inside the second duct (32), and which prevents the air flow between the second duct (32) and the high-speed spindle (40) when the first and second connecting elements (11, 31) are not sealingly connected by the sealing means (37), and wherein said first duct (12) comprises a pressing element (18) which is inserted in the first duct (12) and which has an end thereof connected to a plate (19), the plate (19) being located outside of the first duct (12) and being configured to deviate the air flow coming from the first duct (12) and to contact the pin (38), and wherein, at a time when the plate (19) contacts the pin (38) and the at least one first electric contact element (14) and the at least one second electric contact element (34) are not in contact with one another, the air flow coming from the first duct (12) crosses a space disposed between the first connecting element (11) and the second connecting element (31) and goes outside of the device (10) when the first and second connecting elements (11, 31) are not sealingly connected by the sealing means (37).

2. The device (10) according to claim 1, characterized in that the sealing means (37) comprise a sealing O-ring (37) inserted into a groove formed on an external surface of the second connecting element (31).

3. The device (10) according to claim 1, characterized in that an external surface of the pin (38) matches an internal surface of the second duct (32) to prevent the air flow of the pressurized air between the pin (38) and the second duct (32), and from there to the high-speed spindle (40), and characterized in that said pin (38) further comprises an internal seat (35) communicating with the second duct (32) by means of a plurality of openings (33), and communicating with the high-speed spindle (40), to allow the passage of the air flow from the second duct (32) to the high-speed spindle (40) when the external surface of the pin (38) and the internal surface of the second duct (32) are not in contact and the air flow can flow between the pin (38) and the second duct (32).

4. The device (10) according to claim 3, characterized in that the pin (38) is connected to an elastic means (36) which is configured to exert a force on the pin (38) when said pin (38) slides inside the second duct (32) under an action of the pressing element (18), in order to allow the air flow coming from the first duct (12) to flow between the pin (38) and the second duct (32) and, through the plurality of openings (33), in the internal seat (35) of the pin (38), arriving at the high-speed spindle (40).

5. The device (10) according to claim 1, characterized in that said pressing element (18) inserted inside the first duct (12) is configured to exert a pressure on the pin (38) when said first and second connecting elements (11, 31) are sealingly connected.

6. The device (10) according to claim 1, characterized in that the first connecting element (11) comprises a plurality of holes (21) formed in a closing wall (22) of the first duct (12), and characterized in that the pressing element (18) comprises an end connected to the plate (19), the plate (19) configured to deviate the air flow exiting from the plurality of holes (21), in order to keep clean a respective surface of each of the at least one first and the at least one second electric contact elements (14, 34) and to keep clean an inside of the first connecting element (11).

7. The device (10) according to claim 1, characterized in that the first connecting element (11) comprises a closing element (56) driven by actuating means (57), which comprises a pneumatic element supplied with a pressurized fluid, so that said pneumatic element (57) slides to handle the closing element (56).

8. A process for automatically sealingly connecting the first and the second connecting elements (11, 31) of the device (10) according to claim 1, the process comprising the following steps:

a step of providing the device (10) according to claim 1;

a step of inserting the second connecting element (31) inside a seat (55) of the first connecting element (11), so that the first and second connecting elements (11, 31) are not sealingly connected with one another; in this step, the at least one first electric contact element (14) and the at least one second electric contact element (34) are not yet in contact, the plate (19) and the pin (38) are in contact, and the air flow of the pressurized air, coming from the first duct (12) crosses a plurality of holes (21) of a closing wall (22) of the first connecting element (11), is deviated by the plate (19), and crosses the space between the seat (55) of the first connecting element (11) and the second connecting element (31) and goes outside of the device (10);

a step wherein a tool change system takes the high-speed spindle (40) in position, to make the sealing connection between first and second connecting elements (11, 31); in this step, an electric contact is established between the at least one first electric contact element (14) and the at least one second electric contact element (34), and the pressing element (18) exerts on the pin (38) a pressure that, by compressing an elastic means (36), slides said pin (38) into the second duct (32) allowing the passage of the air flow coming from the first duct (12) to the second duct (32) and, through a plurality of openings (33), in an internal seat (35) of the pin (38), and towards the high-speed spindle (40).

9. A high-speed spindle (40), comprising:

the device (10) according to claim 1, the device (10) for the automatic connection of the high-speed spindle (40) to a numerically controlled machine.

* * * * *